United States Patent [19]
Olsen

[11] 3,899,956
[45] Aug. 19, 1975

[54] LINEAR ELECTROHYDRAULIC PULSE DRIVE ACTUATOR

[75] Inventor: Zenny Olsen, Southington, Conn.

[73] Assignee: Olsen Controls, Inc., Plantsville, Conn.

[22] Filed: Nov. 5, 1973

[21] Appl. No.: 412,634

[52] U.S. Cl. .................. 91/368; 91/459; 91/467
[51] Int. Cl. ............................................. F15b 9/10
[58] Field of Search .............. 91/382, 380, 368, 467

[56] References Cited
UNITED STATES PATENTS

| | | | |
|---|---|---|---|
| 2,311,010 | 2/1943 | Vickers | 91/382 |
| 2,954,837 | 10/1960 | Ziskal | 91/380 |
| 3,070,072 | 12/1962 | Folkerts | 91/380 |
| 3,292,499 | 12/1966 | Duffy | 91/368 |
| 3,457,836 | 7/1969 | Henderson | 91/380 |
| 3,530,764 | 9/1970 | Tomita | 91/380 |
| 3,695,295 | 10/1972 | Olsen et al. | 137/625.69 |

Primary Examiner—Paul E. Maslousky
Attorney, Agent, or Firm—Kenneth B. Hamlin

[57] ABSTRACT

A linear electrohydraulic pulse drive actuator is disclosed which comprises an electrical stepping motor, a rotary input-rotary feedback servo valve, a linear hydraulic cylindrical actuator and an internal ball-screw feedback to control the servo valve with all integrated into unitary housing.

3 Claims, 4 Drawing Figures

LINEAR ELECTROHYDRAULIC PULSE DRIVE ACTUATOR

BACKGROUND OF THE INVENTION

1. Field of the Invention

This invention relates to pulse drives for direct digital positioning, and more particularly to linear electrohydraulic pulse drive actuators.

2. Description of the Prior Art

Rotary electrohydraulic digital actuators or electrohydraulic stepping motors as they are sometimes called are well known. These are actually a combination of an electrical stepping motor and a hydraulic torque amplifier or hydraulic motor. The electrical stepping motor responds to each input control pulse by rotating its output shaft through a fixed angle and the hydraulic motor output shaft rotates through a fixed angle in response to each step of the electrical motor. By combining the speed of an electrical stepping motor with the power of hydraulics in this manner rotary electrohydraulic stepping motors are able to provide the high power and speed response required, for example, for large numerical control machine tool systems.

In applications where the digital positioning is linear as in the controlled movement of machine tool slides for example, the rotary output of such electrohydraulic stepping motors must be converted to linear motion. This has generally been accomplished by mechanical arrangements such as rack and pinion gears, nut-screw or ball-screw drives and these arrangements have a number of disadvantages. In heavy duty applications for example, the nut-screw or ball-screw drive must be able to transmit the high power required to position the heavy load. Thus larger and more costly drives are required. Further the heavily loaded drives of this type are more susceptible to thread wear than lightly loaded drives. This results in increased backlash and reduced accuracy of the digital positioning. The nut-screw and ball-screw drives used, in known arrangements also require boots or metal shields for protection from dirt, chips, or other objects which can damage or jam the threads or ball threads. These shields are not always reliable under long exposure to severe environmental conditions.

SUMMARY OF THE INVENTION

It is an object of the present invention to overcome the above-described difficulties and disadvantages of rotary electrohydraulic stepping motors.

It is another object of the present invention to provide a linear electrohydraulic pulse drive actuator which is integrated into a self-contained package and which may be directly connected to the mechanism to be controlled.

It is a further object of the invention to reduce the cost of manufacturing and concomitantly increase the reliability and accuracy of linear drives for direct digital positioning.

The foregoing and other objects are attained in an illustrative embodiment of a linear electrohydraulic pulse drive actuator in accordance with the present invention which comprises an electrical stepping motor, a rotary input-rotary feedback servo valve, a linear hydraulic cylindrical actuator and an internal ball-screw feedback to control the servo valve all integrated into a unitary housing.

It is a feature of the present invention that the ball carrier of the ball-screw feedback drive is mounted directly on the piston of the cylindrical actuator and the screw is connected to the rotary feedback shaft of the servo valve with the actuator, valve, and feedback drive integrated into the same housing. The piston rod which positions the load is hollow to permit the screw to extend therein. As the piston moves, the ball carrier mounted thereon forces the screw to rotate to apply rotary feedback to the servo valve. In accordance with one aspect of the invention not only is the ball-screw protected from dirt or foreign objects which can cause a malfunction but it is continuously lubricated in the oil which controls the position of the piston.

Another important aspect of the present invention is that the piston of the cylindrical actuator is directly connected to the load to be positioned. This eliminates the need for a rotary-to-linear power conversion provided by the nut-screw or ball-screw arrangements used with the known rotary electrohydraulic stepping motors. In the linear pulse drive actuator of the present invention the ball-screw drive only supplies sufficient power for feedback control of the servo valve and thus advantageously is smaller and less costly than prior arrangements. Furthermore because the ball-screw feedback is lightly loaded the accuracy in feedback control of the servo valve is increased.

In accordance with another feature of the invention the ball carrier of the ball-screw feedback drive comprises two ball nuts; one loaded against the other to eliminate backlash with the loading under continuous and automatic adjustment to compensate for bearing and thread wear.

BRIEF DESCRIPTION OF THE DRAWING

The foregoing and other objects and features of the present invention will be more readily understood from a detailed description of an illustrative embodiment thereof when read with reference to the accompanying drawing in which.

DETAILED DESCRIPTION

Figure 1:
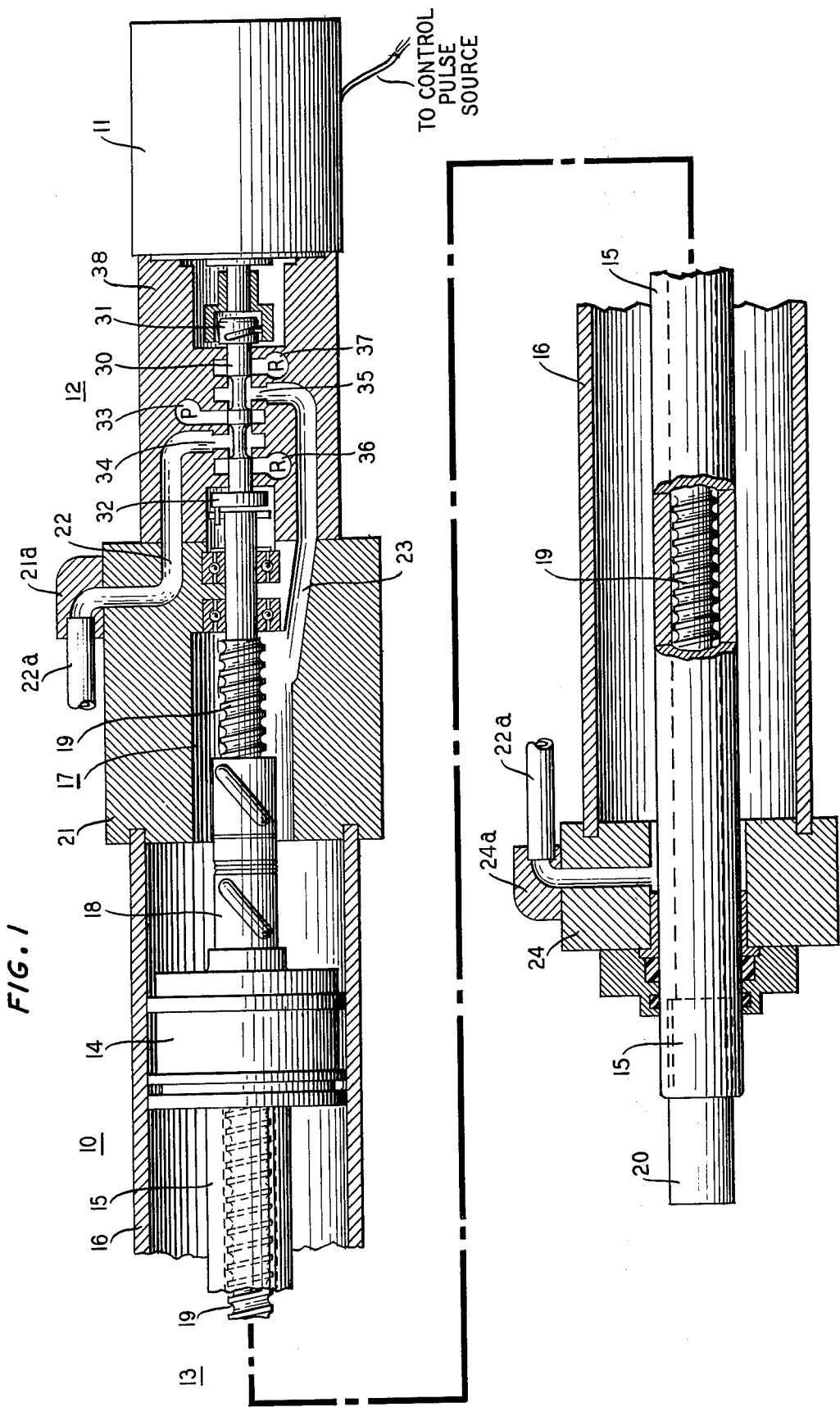
FIG. 1 is a sectional view of the linear electrohydraulic pulse drive actuator of the present invention.
Figure 2:
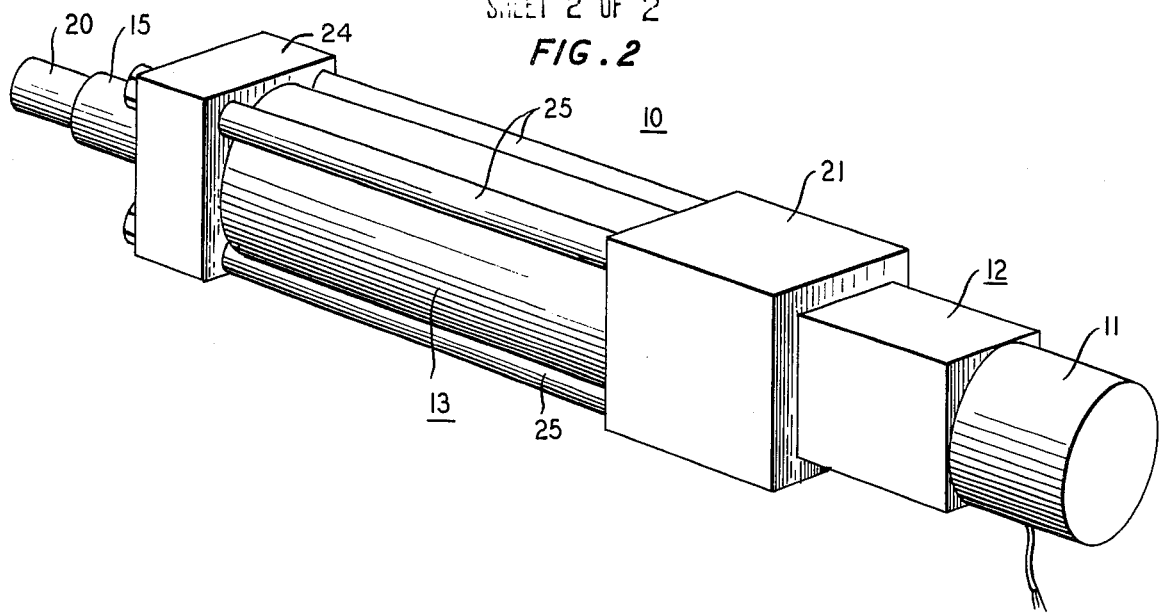
FIG. 2 is a perspective view of the actuator of FIG. 1 showing an illustrative assembly arrangement.

The illustrative embodiment of a linear electrohydraulic pulse drive actuator 10, in accordance with the present invention, as shown in FIGS. 1 and 2 of the drawing, comprises an electrical stepping motor 11, a rotary input-rotary feedback servo valve 12, a linear hydraulic cylindrical actuator 13 comprising a piston 14, a hollow piston rod 15 and a cylindrical sleeve 16, and an internal ball-screw feedback 17 comprising ball carrier 18 and screw 19. Piston rod 15 terminates in a stud 20 threaded into the hollow rod 15. The load to be positioned is secured to stud 20 in any suitable manner such that rod 15 is restricted from rotation. Alternatively the load may be threaded into rod 15, thus eliminating the stud 20.

A manifold 21 is positioned between actuator 13 and valve 12 to provide one termination for sleeve 16 and to provide control fluid passages 22 and 23 for control of actuator 13 by valve 12. The opposite end of sleeve 16 is terminated by flange 24 through which rod 15 extends to the load. Manifold 21 and flange 24 are provided with fluid fittings 21a and 24a respectively to receive tube 22a which extends fluid passage 22 in manifold 21 to the left side of piston 14 in actuator 13 as shown in FIG. 1.

Stepping motor 11 is secured to valve 12 in any known manner as shown in FIG. 1 with its output shaft coupled in any conventional manner to the rotary input shaft of valve 12. Valve 12 is in turn secured to manifold 21 in any known manner. Flange 24 and sleeve 16 are held rigid to manifold 21 by tie roads 25 as shown in FIG. 2. Suitable bearings and seals as known in the art and as shown in FIG. 1 are provided. Thus the linear pulse drive actuator 10 in accordance with one aspect of the present invention is integrated into a unitary housing.

Stepping motor 11 may be any of the electrical stepping motors well known in the art which operate in response to an electrical control pulse to rotate its shaft through a fixed angle. One such known stepping motor which may advantageously be used for stepping motor 11 requires 200 control pulses to rotate 1 revolution of its output shaft and operates at a rate of 5,000 pulses per second.

Servo valve 12 advantageously is a rotary input-rotary feedback servo valve of the type described in U.S. Pat. No. 3,695,295 of Benny Olsen and Zenny Olsen granted Oct. 3, 1972. As described in detail in this patent and as shown in the illustrative embodiment of the present invention in FIG. 1, servo valve 12 comprises a valve body 38 which contains a cylindrical bore as shown for accommodating a spool 30 as in a four-way linear motion spool valve. Spool 30 of valve 12 is coupled to the rotary input shaft of the valve through a rotary-to-linear translator 31 and to the rotary feedback shaft through a universal coupler 32 so that rotary motion input and rotary motion feedback are translated into linear movement of spool 30 in valve 12. Linear movement of spool 30 controls the flow of pressurized fluid from an input pressure port 33, through control ports 34 or 35, through respective fluid passages 22 or 23 to actuator 13 and to return ports 36 and 37. Fluid passages 22 and 23 terminate on opposite sides of piston 14 in actuator 13 and enable the flow of pressurized fluid from servo valve 12 to control the linear position of piston 14, rod 15 and the load connected thereto.

In accordance with an aspect of the invention, feedback control for servo valve 12 is provided by ball-screw drive 17 located within actuator 13 and manifold 21 as shown in FIG. 1. Ball-screw drives are well known motion transfer devices which have replaced the sliding friction of the conventional nut-screw drives with the rolling friction of bearing balls. The bearing balls circulate in the hardened steel races formed by concave helical grooves in the screw and ball carrier. The load is thus carried by the bearing balls and as the screw and ball carrier rotate relative to each other, bearing balls are diverted from one end of the ball carrier to the other by ball return tubes.

Ball-screw drives used in the known position control systems translate rotary motion to linear motion which means that the screw rotates to move the ball carrier linearly and both must supply the power required to position the load. Contradistinguished to the known systems the ball-screw drive 17 utilized in the present invention does not translate rotary motion to linear motion but translates linear motion to rotary motion and only supplies the small power required for rotary feedback control of servo valve 12.

Figure 3:
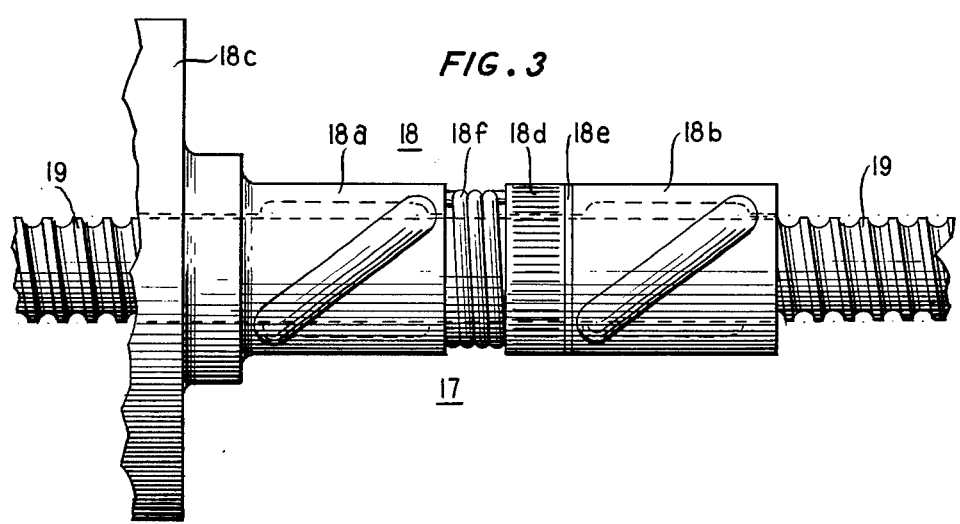
FIG. 3 is an enlarged view of the ball-screw drive utilized for feedback control in the actuator shown in FIG. 1.

As shown in FIG. 1 screw 19 of ball-screw drive 17 is connected to the rotary feedback shaft of servo valve 12 through universal coupling 32. Screw 19 extends through piston 14 and into hollow piston rod 15 such that piston 14 and rod 15 are free to move linearly in sleeve 16 under control of the pressurized fluid ported through servo valve 12. Ball carrier 18 as shown in greater detail in FIG. 3 comprises two ball nuts 18a and 18b. Ball nut 18a terminates in a flange 18c which is secured to the face of piston 14 in any known manner. The opposite end of ball nut 18a terminates in an anti-rotation key 18k which extends into a slot 18s in ball nut 18b to prevent rotation of ball nut 18b. Ball nut 18b is locked to ball nut 18a in the manner shown in FIGS. 3 and 4 by a threaded coupler 18d and spacer washer 18e. Thus as piston 14 moves linearly in actuator 13, ball carrier 18 secured thereto causes screw 19 to rotate and apply rotary motion to the rotary feedback shaft of servo valve 12.

Figure 4:
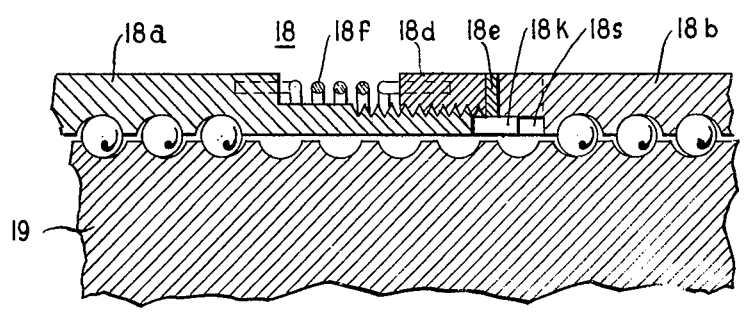
FIG. 4 is a sectional view of the ball-screw drive shown in FIG. 3.

The use of two ball nuts with one loaded against the other to reduce backlash in ball-screw drives is known in the art. The controlled separation of the two nuts forces the bearing balls in the respective nuts to ride up or cam on opposite faces of the ball thread of the screw as illustrated in FIG. 4. By preloading the two ball nuts against each other in this manner, the backlash is minimized when the relative movement of the ball nuts and screw is reversed. In the prior art ball-screw drives of this type the desired amount of preloading is controlled by adjusting a threaded coupler such as coupler 18d illustrated in FIG. 3 and 4 to determine the degree of forced separation of the two ball nuts and then locking the coupler in a fixed position by a set screw.

The preloading is substantial in the ball-screw drives of the type described above when used in known position control system to transmit power to the load to be positioned. This causes bearing ball wear and ball thread wear of the screw. When such wear occurs the bearing balls will drop from their cam positions on the faces of the ball thread of the screw toward the bottom of the thread and this results in increased backlash. To minimize the resulting backlash in these known systems the threaded coupler between the two ball nuts must be repeatedly adjusted to prevent a buildup of backlash and a resulting reduction in position control accuracy.

In accordance with an aspect of the invention the bearing ball wear and ball thread wear of ball-screw drive 17 is substantially reduced because only the small force required to rotate the feedback shaft of servo valve 12 is transmitted by drive 17. As a result very light preloading of the two ball nuts 18a and 18b against each other by coupler 18d, in the manner described above, is required. This light preloading is also made continuously and automatically adjustable in accordance with another aspect of the invention, to compensate for any bearing ball or ball thread wear which may occur after prolonged operation. This is accomplished by eliminating the set screw used in the prior art ball-screw drives to lock the coupler 18d at a fixed preload position and by installing a torsion spring 18f between ball nut 18a and coupler 18d as shown in FIGS.

3 and 4. Spring 18f is retained in the "wound" condition by insertion in holes in ball nut 18a and coupler 18d as shown so that it applies a constant torsional force tending to rotate coupler 18d against ball nut 18b. Thus if wear should occur, any tendency for the bearing balls to drop toward the bottom of the ball thread of screw 19 is eliminated by the automatic rotation of coupler 18d to increase the separation of ball nuts 18a and 18b and force the bearing balls to their original cam positions on opposite faces of the ball thread of screw 19.

The operation of the illustrative embodiment of the linear electrohydraulic pulse drive actuator shown in FIG. 1 will now be described. With a stepper motor 11 requiring 200 control pulses per revolution as indicated hereinbefore, each control pulse rotates the shaft of motor 11 by 1.8°. This rotary motion is translated into linear movement of spool 30 in servo valve 12 by rotary-to-linear translator 31. The pitch of translator 31 may illustratively be such that the 1.8° rotary step input moves spool 30 linearly 0.00125 inches. Assume that this movement of spool 30 is to the left in valve 12 as shown in FIG. 1. Pressurized fluid will then be ported through control port 35 in valve 12 and through fluid passage 23 to the right side of piston 14 in actuator 13 as shown in FIG. 1. The pressurized fluid will cause piston 14, piston rod 15 and the load attached thereto to move 0.001 inches to the left. As piston 14 moves to the left ball carrier 18 forces screw 19 to rotate. Screw 19 is advantageously a 5-pitch screw so that the 0.001 inch movement of ball carrier 18 results in screw 19 making 1/200 revolutions. This 1.8° revolution of screw 19 is coupled through universal coupler 32 to spool 30 of valve 12 turning spool 30 the same amount. The rotation of spool 30 by 1.8° is translated into linear movement of spool 30 to the right by the rotary-to-linear translator 31. This rightward movement of spool 30 closes control port 35 which places servo valve 12 in the null condition and halts movement of the load. Stepping motor 11 steps in the opposite direction to control the actuator 13 in a similar manner to move piston 14, rod 15 and the load to the right.

The output speed and force of actuator 13 in positioning the load depends upon the applied fluid pressure, the diameter of piston 14, and the capacity of servo valve 12. Advantageously this linear electrohydraulic pulse drive actuator of the present invention may be equipped with a servo valve 12 with a capacity of 15, 30 or 60 gallons per minute based on 1000 pounds per square inch pressure, with the diameter of piston 14, and sleeve 16 of cylindrical actuator 13 between 1 ½ inches and 14 inches, and with a maximum system fluid pressure of 3000 pounds per square inch. Maximum speed depends upon valving but typically is 400 inches per minute. A 5000 Hz control pulse source applied to motor 11, for example, will move piston 14, rod 15 and the load attached thereto at a rate of 5 inches per second or 300 inches per minute.

It is to be understood that the above-described embodiment is illustrative only of the principles of the present invention. Numerous other arrangements may be devised by those skilled in the art without departing from the spirit and scope of the invention.

What is claimed is:

1. An electrohydraulic pulse drive actuator comprising in combination an electrical stepping motor having an output shaft, a servo valve having a rotary input shaft and a rotary feedback shaft, means connecting the output shaft of said motor to the input shaft of said valve, a hydraulic actuator controlled by said valve, said actuator comprising a cylinder and a piston moveable therein, means for integrating said actuator and said valve into a unitary housing, and feedback means within said housing and operating therein for providing feedback control from said actuator to the feedback shaft of said valve, said feedback means comprising a ball-screw drive for translating linear movement of said pistion into rotary movement of said feedback shaft, said ball-screw drive comprising a ball carrier secured to said piston and a screw connected to said feedback shaft and wherein said ball carrier comprises two ball nuts, loading means for loading one ball nut against the other on said screw to reduce backlash and adjusting means for continuously and automatically adjusting said loading to compensate for bearing wear.

2. The combination defined in claim 1 wherein said loading means comprises a coupler threaded on one of said ball nuts to apply a separating force between said two ball nuts to force the bearing balls of said ball nuts to ride up on opposite faces of the ball thread of said screw, and wherein said adjusting means comprises a spring for automatically adjusting said coupler to maintain said separating force substantially constant.

3. The combination defined in claim 2 wherein said spring is a torsion spring positioned between said one ball nut and said coupler to apply a constant torsional force to said coupler tending to rotate said coupler against the other ball nut.

* * * * *

UNITED STATES PATENT AND TRADEMARK OFFICE
Certificate

Patent No. 3,899,956  Patented August 19, 1975

Zenny Olsen

Application having been made by Zenny Olsen, the inventor named in the patent above identified, and Olsen Controls Incorporated, Plantsville, Conn., a corporation of New Hampshire, the assignee, for the issuance of a certificate under the provisions of Title 35, Section 256, of the United States Code, adding the name of Benny Olsen as a joint inventor, and a showing and proof of facts satisfying the requirements of the said section having been submitted, it is this 20th day of April 1976, certified that the name of the said Benny Olsen is hereby added to the said patent as a joint inventor with the said Zenny Olsen.

FRED W. SHERLING,
*Associate Solicitor,*